May 28, 1929.  R. M. ROBINSON  1,714,892
PORCELAIN ROOT TOOTH
Filed Aug. 3, 1922
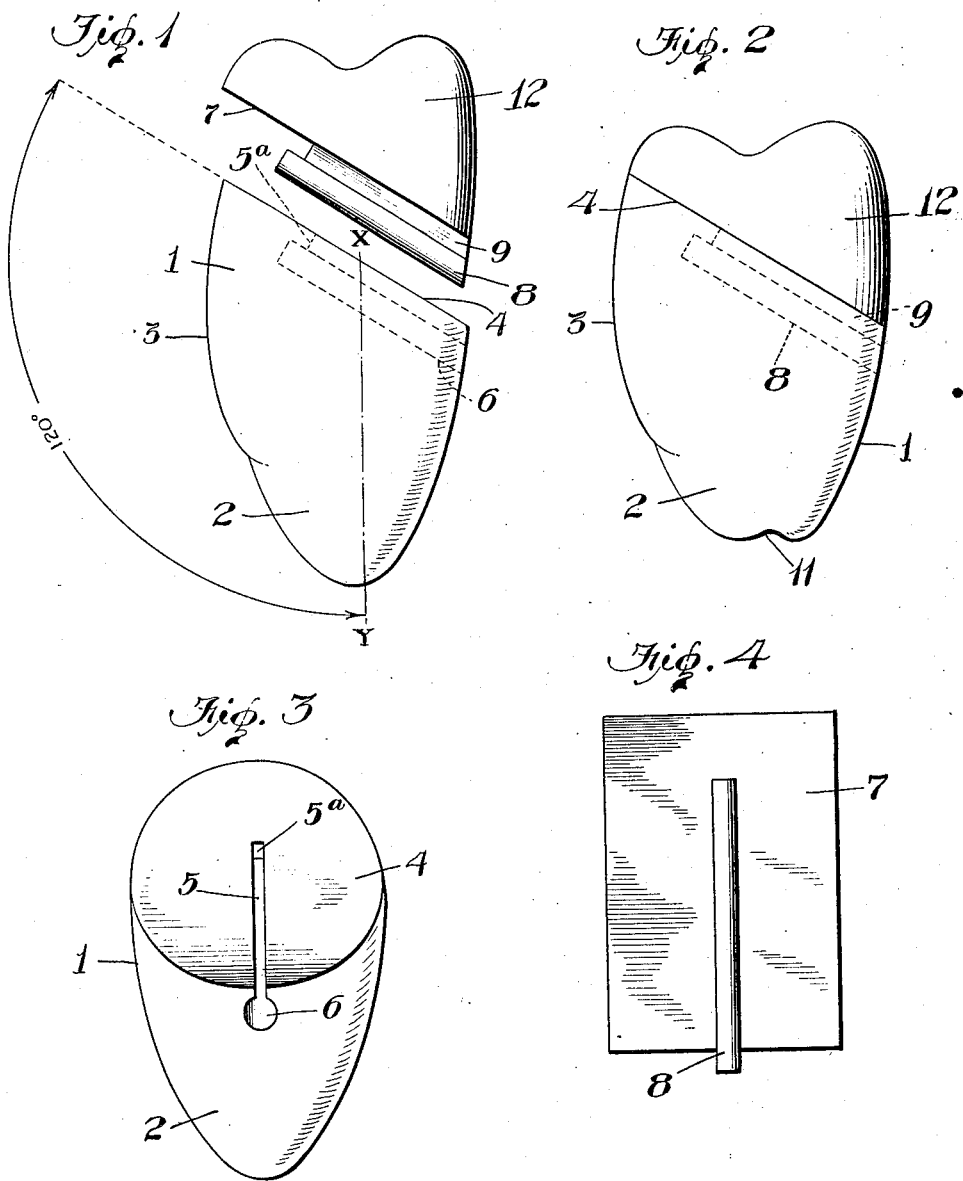

Patented May 28, 1929.

1,714,892

UNITED STATES PATENT OFFICE.

ROBERT M. ROBINSON, OF FULTON, MISSOURI, ASSIGNOR TO THE COLUMBUS DENTAL MANUFACTURING COMPANY, OF COLUMBUS, OHIO, A CORPORATION.

PORCELAIN ROOT TOOTH.

Application filed August 3, 1922. Serial No. 579,380.

The object of my invention is to provide an interchangeable artificial porcelain root tooth, each tooth having the depressions, elevations, shape and contour on its buccal or labial face as is the general characteristic of the natural tooth it is to replace, also a root portion, said root either to be placed in the socket (alveolus) after a recent extraction or to be placed in contact with the soft tissues in partial edentulous cases of long standing where the soft tissues have healed over the bony structures. Said tooth to have in combination a backing, said backing to cover that portion of the tooth which is subjected to the stresses and strains imposed by the antagonistic teeth of the opposite arch during the act of mastication; the dentist to add to the backing such metal as is necessary to restore proper shape and contour for a masticating or incising surface. It is obvious by this method that the porcelain is well protected.

Hitherto the dentist has been obliged to select an artificial tooth as sold by the manufacturers and add porcelain to it. It was necessary that the dentist have exceptional skill to manipulate the porcelain from its finely powdered state until it was glazed for application in the mouth. For esthetic and physiological reasons, it is necessary that teeth have depressions, elevations, shape and contour similar to the general characteristics of the type teeth they are to replace in the mouth. This requires the skill of an artist for the blending of shades (colors), the skill of a sculptor for the carving of the proper shapes and contours, and the experience of a porcelain worker for making the tooth body. It is obvious that the dentist finds it difficult to produce a satisfactory article, to say nothing of the expensive equipment and the time consumed in making the tooth.

My improved tooth is manufactured with certain standards of dimension making it interchangeable with its backing, thus it is replaceable (interchangeable) in the mouth, and should breakage occur, a new tooth can accurately and quickly be supplanted. The said tooth has the depressions, elevations, striations, shape and contour of its labial or buccal surface as is the general characteristic of the type tooth it is to replace in the mouth, which therefore, adds materially to its esthetic value and its physiological function.

The said tooth further has as a part thereof, an artificial root which is made to be placed in a tooth socket (alveolus) of recent extraction or to rest on the soft tissues of the edentulous part of the ridge. The said artificial porcelain root is highly advantageous for its esthetic value, its sanitary effect (there being no sharp angles or pores to collect food debris or calculous deposits from the saliva) and its physiological effect (porcelain is kind to the tissues and is tolerated by the tissues to a greater extent than any foreign substance known to date). When the said porcelain root is placed in a socket where a natural tooth has been recently extracted, the tissues will close in firmly around it preserving substantially the natural appearance of the gums. Whereas without the porcelain root the tissues absorb leaving a larger space than existed prior to the extraction.

In the drawings:

Figure 1 is a side elevation of my improved tooth and my improved backing detached therefrom, and carrying a cusp, Fig. 2 is a similar view with the backing and cusp attached to the tooth, Fig. 3 is a perspective view looking at the lingual face of my improved tooth, and Fig. 4 is a bottom plan view of the backing.

In the claim the word "buccal" and the word "labial" will be used as synonyms.

The tooth is divided into a crown portion 1 and a root portion 2. The crown portion has a buccal or labial face 3, and a flat plane 4, disposed at an angle to the long axis of the tooth X, Y (in the accompanying tooth measured from the buccal 3 side). A post hole 6 having its orifice on the lingual surface and extending inward i. e., bucally centrally disposed and parallel with said flat plane 4, and terminating at a point within the buccal or labial half of the tooth. The post hole may be circular in cross section and of one diameter throughout its entire length as shown in the drawings, or circular in cross section and tapered, the diameter decreasing as the innermost end is approached, or it may be elliptical in cross section and either tapered or of one diameter throughout its entire length. The slot 5 has substantially two parallel lateral walls and a third wall $5^a$ at its buccal or labial end or extremity. The slot does not extend the full length of the post hole 6, but ends perceptibly short of the buccal or labial extremity of the post hole.

The root 2 may be either conically shaped or have a hollowed out saddle effect, 11. The backing 7 is flat and adapted to have a close fit with the flat plane 4 of the tooth, and is provided on its gingival face with a rib 9 surmounted by a post 8 which post is of greater diameter than the rib, the backing, rib and post being complemental with the flat plane, the slot and post hole of the tooth.

I have shown in Figures 1 and 2 of the drawings a metal cusp 12 secured to the backing 7.

What I claim is:

A tooth comprising a crown portion and an integral root portion, the crown portion terminating occlusally in a single flat plane disposed at an angle to the long axis of the tooth and extending labio-occlusally from the lingual to the labial face and from side wall to side wall of the tooth throughout the entire occlusal area, a post hole having its orifice in the lingual face of the tooth and extending inwardly labially and centrally disposed and parallel with the flat plane, a slot of less diameter opening said post hole for a part of its length to the said flat plane of the tooth.

In testimony whereof I affix my signature.

ROBERT M. ROBINSON.